J. SLATTERY.
HEAT RESISTING STRUCTURAL MATERIAL AND PROCESS OF MAKING SAME.
APPLICATION FILED NOV. 6, 1915.
1,215,727. Patented Feb. 13, 1917.
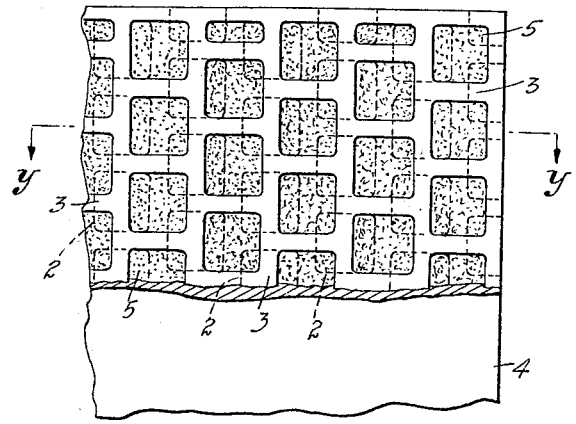
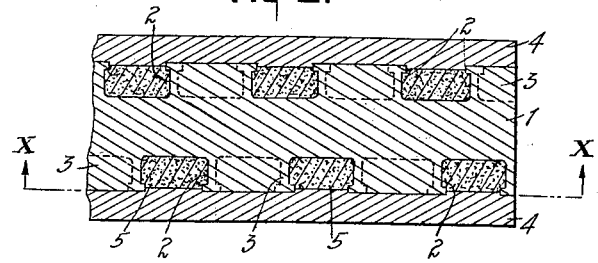
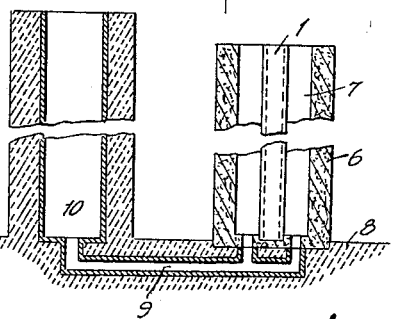
Witnesses
Inventor
John Slattery
By his Attorney

UNITED STATES PATENT OFFICE.

JOHN SLATTERY, OF CHROME, NEW JERSEY.

HEAT-RESISTING STRUCTURAL MATERIAL AND PROCESS OF MAKING SAME.

1,215,727. Specification of Letters Patent. Patented Feb. 13, 1917.

Application filed November 6, 1915. Serial No. 60,063.

*To all whom it may concern:*

Be it known that I, JOHN SLATTERY, a citizen of the United States of America, and a resident of Chrome, county of Middlesex, and State of New Jersey, have invented a certain new and useful Heat-Resisting Structural Material and Process of Making Same, of which the following is a specification.

My invention relates to walls of safes, vaults and the like, and may be embodied in the plates and other structural members of which such safes and vaults are constructed, or in the walls of safes or vaults, which, except for the door and its supports, are of one piece of metal. In some cases safes, vaults and the like have been made, except for the door and its support, of a single casting formed of a material, such as manganese steel, which is very difficult to cut with drills and other tools; and in other cases, safes and vaults have been built up of plates and other structural members some or all of which have been manganese steel. In other cases, safes, vaults and the like have been composed of united laminæ of alternate layers of hard and soft steel; members composed of such laminæ being very difficult to cut through with a drill or other suitable tool. It has been found, however, that materials which resist to a high degree ordinary cutting tools may be penetrated very readily by the use of a cutting flame of high intensity, such as that of an oxy-acetylene burner. My invention comprises a vault or safe wall or plate or other structural member, formed of metal, but having within it pockets filled with a refractory material well adapted to withstand the action of a highly concentrated source of heat, such as the heat of the oxyacetylene burner flame, these pockets being so disposed within the plate or other member that it is practically impossible for such a burner flame or other highly concentrated source of heat to be applied without encountering one of these sealed-in bodies of highly refractory or highly resisting material. My invention also comprises the process of producing such material having pockets containing sealed-in refractory or heat-resisting material.

The object of my invention is to provide material for use in the construction of safes, vaults, etc., which shall be highly resistant not only to the action of cutting tools, but also to the action of highly concentrated sources of heat such for example as the oxyacetylene flame, and to provide a simple process, readily carried out, by which such material can be made.

I will describe my invention herein with especial reference to the construction of safe and vault plates, but it will be understood that in so doing I do not limit myself to the embodiment in my invention of plates only; that the invention is equally applicable to unitary constructions, as well as to structural members other than plates.

I will now proceed to describe my invention with reference to the accompanying drawings, and will then point out the novel features in claims. In said drawings:

Figure 1 shows a partial elevation and partial section on a plane parallel to the elevation, of a safe or vault plate or wall embodying my invention, the section being taken on the line $x$—$x$ of Fig. 2.

Fig. 2 shows a transverse section of the safe or vault member or wall shown in Fig. 1, the section being taken on the line $y$—$y$ of Fig. 1.

Fig. 3 shows a central vertical section of casting apparatus whereby a plate or other structural member such as shown in Figs. 1 and 2 may be produced.

The safe or vault plate or wall shown in Figs. 1 and 2, comprises an inner member 1 having pockets 2 in its opposite faces, the pockets in the two faces being staggered relatively so that each separating web 3 has, opposite it, on the other side of the plate, a pocket space 2; and these pockets are closed by outer plates 4, strongly united to the plate 1, preferably by being welded to the plate 1. In general, I prefer that the plate 1 should be of very hard steel, such for example as chrome steel, and the plates 4 of relatively softer steel; though this relation may be reversed, the inner plate being of the soft steel and the outer plate of hard steel; and I do not limit myself to the forming of either or any of the plates 1 and 4 of steel. The pockets 2 are filled with a heat resisting material which preferably is a material which will permit the combined structure 1—4 to be rolled or hammered or otherwise worked, after such combined structure is produced. To this end said material 5 filling the pockets may be a silicious material, such as sand, which, at the heat required for the rolling, hammering, or other working of the plate 1—4, will be molten; or, the said filling material 5 may be a material which, being pulverulent, will flow while the combined structure 1—4 is being worked; powdered carborundum is an example; or, the said filling material may be a mixture of fusible and non-fusible materials, such for example as a mixture of silica and carborundum. By non-fusible material I mean a material which is not fusible at the temperatures at which metals, such for example as steel, may be worked. Carborundum, graphite, etc., are possibly fusible materials; but if fusible their temperature of fusion is so high that, for my purposes, they may be considered to be infusible materials. I do not limit myself to the use of non-metallic materials for the filling material 5, since some metals, such as copper, which are actually fusible at temperatures below the fusing point of steel, nevertheless resist the oxy-acetylene flame and similar sources of highly concentrated heat, much better than do iron and steel; it being well known that it is practically impossible to cut copper by the oxy-acetylene flame; such power of resistance of copper and some other materials to the oxy-acetylene flame, being due, very probably, to the high heat conductivity of such metals as compared with the heat conductivity of steel; a result of such high heat conductivity being that the heat imparted to the copper or other resistant metal by such a flame is conducted away so rapidly that cutting of the metal by the flame is prevented, whereas steel, being a much less conductive material, becomes highly heated locally by the action of such a flame.

In producing a compound heat resisting material such as that illustrated in Figs. 1 and 2, it is convenient to cast the intermediate member 1 in a suitable mold, and in so doing to form the pockets 2 therein; though of course member 1 having the pockets 2 might be formed in other ways; for example, by machine work. The pockets 2 are then filled with the heat resisting material 5, such filling preferably not completely filling the pockets, but leaving slight depressions which the metal of the plates 4 may fill, so as to produce a mechanical interlocking of the members 1 and 4, as illustrated in Fig. 2. Preferably, the pockets 2 are undercut, so that the filling material 5 is held mechanically within these pockets. This is also illustrated in Fig. 2. The plate 1 with its pockets filled with heat resisting material, as described, is then placed in a suitable ingot mold 6 (Fig. 3) the mold being of such form that spaces remain in the mold to be filled with molten metal to form the outer plates 4. 7 in Fig. 3 designate such spaces. Molten metal to form the outer plates or layers 4 is then introduced into the spaces 7 and by the heat of the molten metal, with or without subsequent working of the compound ingot thus produced, the metal of the layers 4 is united, preferably by a weld-union, to the plate 1. In Fig. 3 I have illustrated the ingot mold 6 as arranged for bottom pouring, such mold being supported upon a pouring plate 8 having within it a duct 9 leading from a pouring header 10, the duct 9 having branches communicating with the ingot mold on opposite sides of the plate 1. It is well known that by flowing molten steel into an ingot mold and around an inserted plate 1 within that mold, a weld may be produced between such inserted plate and the metal so cast in the mold.

The compound member thus produced may be rolled, hammered, pressed, or otherwise worked in the ordinary manner, and thereby the metal may be condensed, and extended and improved in quality as a result of such working; the nature of the filling material sealed within the pockets of that member, being such, as already explained, as will permit this working of the compound member. Or, if preferred, the mold 7, and the plate or plates 1 set therein, may be of such form that, as a result of the casting of the metal for the sealing layers 4 about such member 1, the complete safe or vault is produced without occasion for any working of the metal.

Because of the facility with which a compound member produced as described, and having within its pockets containing heat resisting material, may be worked, ingots produced as described may be rolled or otherwise reduced to the form of rods, jail bars, jail plates or other structural members used in jail construction.

What I claim is:—

1. A metal article such as described comprising a metal body having within it pockets containing heat resisting material, such pockets being hermetically sealed.

2. A metal article such as described comprising a central portion having on opposite sides pockets containing heat resisting material and metallic covering for such pockets united to such central portion and sealing the pockets hermetically.

3. A metal article such as described comprising a central portion having on opposite sides pockets containing heat resisting material, the pockets on opposite sides of such portion being staggered relatively so that webs between pockets on one side are opposite pockets on the other side, and metallic covering for such pockets united to such central portion and sealing the pockets hermetically.

4. A compound metal article such as described comprising a central layer having pockets in opposite sides containing heat resisting material and outer layers welded to said central layer and hermetically closing said pockets.

5. A compound metal article such as described comprising a central layer having pockets in opposite sides containing heat resisting material, the pockets on opposite sides of such central layer being staggered relatively so that webs between pockets on one side are opposite pockets on the other side, and outer layers welded to said central layer and hermetically closing said pockets.

6. The herein described method of producing cutting-flame-resisting members which comprises forming an intermediate portion having pockets therein, filling such pockets with heat resisting material, and then uniting sealing layers to said intermediate layer.

In testimony whereof I have signed this specification in the presence of two subscribing witnesses.

JOHN SLATTERY.

Witnesses:
ALEXANDER H. CLARK,
G. W. MORGAN.

Copies of this patent may be obtained for five cents each, by addressing the "Commissioner of Patents, Washington, D. C."